H. C. KIENINGER.
VEHICLE HEADLIGHT.
APPLICATION FILED APR. 27, 1912.
1,043,843.
Patented Nov. 12, 1912.
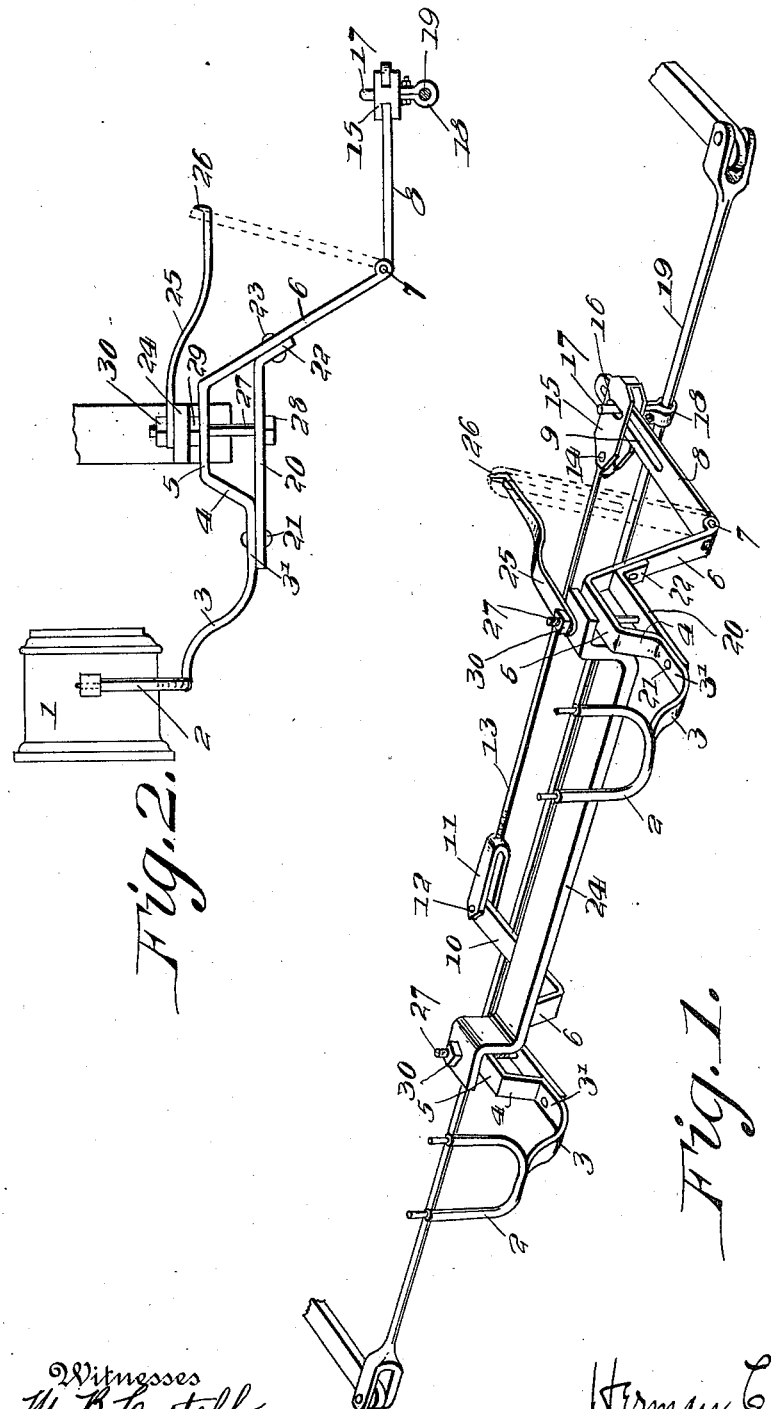

UNITED STATES PATENT OFFICE.

HERMAN C. KIENINGER, OF POCAHONTAS, MISSOURI.

VEHICLE-HEADLIGHT.

1,043,843.  Specification of Letters Patent.  Patented Nov. 12, 1912.

Application filed April 27, 1912. Serial No. 693,706.

*To all whom it may concern:*

Be it known that I, HERMAN C. KIENINGER, a citizen of the United States, residing at Pocahontas, in the county of Cape Girardeau and State of Missouri, have invented new and useful Improvements in Vehicle-Headlights, of which the following is a specification.

This invention relates to certain new and useful improvements in vehicle head-lights, and the object of the invention is to provide novel, improved and simple means for causing the head lights to follow the movements of the front or steering wheels of the vehicle.

A further object of the invention is to provide a device of this character in which one or both of the head lights may be easily and quickly disconnected to remain stationary during the turning movements of the vehicle.

In the drawings: Figure 1 is a perspective view of the invention detached from the vehicle, and Fig. 2 is a side elevation showing the device in position on a vehicle.

The headlights or lamps 1 are secured to the supporting forks 2, and the latter are secured at their bases to the brackets 3. The brackets 3 are composed of arms that are downwardly curved and formed with short horizontal parts 3′, which latter are continued upwardly at an incline at 4, then horizontally at 5, and downwardly at an incline at 6, the inclined parts 6 terminating below the horizontal part 3′ and one of same is hinged at 7 to a horizontal link 8. The hinged link 8 is slotted at 9 at its free or rear end. The other bracket is similar in construction to that described, but it has an integral rearwardly extending horizontal portion 10 in lieu of the hinged link 8 that the first mentioned bracket has. A U-shaped clip 11 is pivoted at 12 to the rear free end of the portion 10 and has a threaded aperture in its closed end in which the threaded end of a rod 13 is adjustably engaged. The opposite end of the rod 13 is secured by pin 14 to a U-shaped clip 15 which latter is slotted at 16 to receive the pin 17 that is carried by the clamp 18 rigidly secured to the steering rod 19. The free end of the link 8 is also passed through the clip 15 and the pin 17 engages through the slot 9 of link 8 as well. A brace 20 is connected at 21 to the horizontal part 3′ of each bracket and has its opposite end turned downwardly at 22 and secured at 23 to the downwardly inclined portion 6.

The radiator support 24 has one of its ends engaged on its top face with one end of a spring arm 25 that has a hook 26 formed on its free end, which arm 25 is capable of being depressed to permit the free end and the hook thereon to enter the slot 9 of the link 8, when the latter is raised to the dotted line position depicted in the drawings and to hold same raised. When the link 8 is in the dotted line position shown in the drawings, the lamp at the right hand side of Fig. 1 will remain stationary, while the other lamp will continue to partake of the movements of the steering mechanism. Should it be desired to disconnect the lamp at the left of Fig. 1, as well, it is merely necessary to either remove the pin 12, or disengage the clip 15 from the pin 17. It will be also seen from the above that both lamps are connected to and operated from a single point on the steering rod of the vehicle. A bolt 27 has its head 28 abutting the under face of the brace 20, and has a nut 29 thereon which engages between the top face of the horizontal part 5 of the bracket and the under face of the radiator support 24, a nut 30 being mounted on the bolt 27 at its top end which nut holds the spring arm 25 in place and also holds the bolt to the radiator support.

What is claimed is:

1. In combination with a steering rod, a pair of pivoted lamp carrying brackets, a pin on the rod, means to connect one bracket with said pin and means to connect the other bracket with said pin, said last mentioned means including a hinged link which is slotted to receive the pin and which is disengageable therefrom, and a spring arm having its free end for engagement in the slot of the link to hold the latter in raised position.

2. In combination with a steering rod, and a pin thereon, a pair of pivoted lamp brackets, one of the lamp brackets having a rearwardly extending integral portion and the other having a hinged slotted link connected thereto the slot of which is for the reception of the pin, a rod connected to the free end of the horizontal portion of the first named bracket, and a slotted element connected to the other end of the last named rod and having its slot for the reception of said pin.

3. In combination with a steering rod, and a pin thereon, a pair of pivoted lamp brackets, one of the lamp brackets having a rearwardly extending integral portion and the other having a hinged slotted link connected thereto the slot of which is for the reception of the pin, a rod connected to the free end of the horizontal portion of the first named bracket, and a slotted element connected to the other end of the last named rod and having its slot for the reception of said pin, and a spring arm adapted to engage in the slot of the link to hold the latter in inoperative position.

4. In combination, with a steering rod, a pair of lamp carrying brackets pivoted between their ends, each bracket having its rear end extending at substantially right angles to the steering rod, a member on said steering rod connected to the rear end of one of said brackets, and a rod extending approximately parallel to said steering rod connected to the rear end of the other of said brackets and to said member.

5. In combination, with a steering rod, a pair of pivoted lamp carrying brackets, a member on the steering rod directly connected with the rear end of one of said brackets, and a rod connected to the rear end of the other bracket and to said member.

6. In combination, with a steering rod, a pair of pivoted lamp carrying brackets, one of said brackets having a movable part, a member on the steering rod having detachable connection with said movable part, means to connect said member with said movable part, means to independently connect the other bracket with said member, and means to hold said movable part in rigid position when disconnected from said member of the steering rod.

In testimony whereof I have hereunto set my hand in presence of two subscribing witnesses.

HERMAN C. KIENINGER.

Witnesses:
D. C. THOMPSON,
HENRY W. PUTZ.

---

Copies of this patent may be obtained for five cents each, by addressing the "Commissioner of Patents. Washington, D. C."